United States Patent
Poss et al.

(10) Patent No.: US 8,724,244 B1
(45) Date of Patent: May 13, 2014

(54) EFFICIENT ROTATIONAL PARAMETER CONTROL FOR HARD DISK DRIVE

(71) Applicant: HGST Netherlands B.V., Amsterdam (NL)

(72) Inventors: Joey Martin Poss, Rochester, MN (US); Bijan Rafizadeh, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/726,207

(22) Filed: Dec. 23, 2012

(51) Int. Cl.
*G11B 5/09* (2006.01)
(52) U.S. Cl.
USPC .................. 360/46; 360/55; 360/67; 360/59
(58) Field of Classification Search
None
See application file for complete search history.

(56) References Cited

U.S. PATENT DOCUMENTS

| | | | |
|---|---|---|---|
| 5,726,821 A * | 3/1998 | Cloke et al. ............... | 360/67 |
| 7,023,647 B2 | 4/2006 | Bloodworth et al. | |
| 7,430,090 B2 * | 9/2008 | Oyamada et al. ............... | 360/75 |
| 7,457,072 B2 | 11/2008 | Dieron et al. | |
| 7,656,603 B1 | 2/2010 | Xing | |
| 2005/0166015 A1 * | 7/2005 | Bruner et al. ............... | 711/112 |

* cited by examiner

*Primary Examiner* — Muhammad N Edun
(74) *Attorney, Agent, or Firm* — G. Marlin Knight

(57) ABSTRACT

Disk drives with preamp rotational parameter control (RPC) using standard digital serial interface lines to the preamp are described. The standard serial interface lines are used to generate a special signal pattern that does not follow the serial communication protocol. The special signal pattern is used to implement RPC when doing so will not interference with other signals, preferably in the read/write recovery gap between the data and the servo field in a standard track format. A value of a selected preamp parameter can be incremented or decremented by one LSB during the read/write gap time in each servo sector as the disk rotates. Embodiments of the invention allow fly-height and write driver parameters to be varied inside of a single disk revolution. Embodiments are described that include two or four parameters in the set, which allows for multiple updates of each parameter per revolution of the disk.

20 Claims, 11 Drawing Sheets

EFFICIENT ROTATIONAL PARAMETER CONTROL FOR HARD DISK DRIVE

FIELD OF THE INVENTION

The invention relates to the field of design and operation of magnetic recording devices using rotating disks and more particularly to designs and methods for setting and updating parameters for preamplifiers connected to the read and write heads.

BACKGROUND

A typical disk drive has most of the electronics and firmware contained in a system-on-a-chip (SOC), which includes the read/write channel as well as the servo system. Additional electronics that provide an interface between the read/write channel and the plurality of read and write transducers (heads) are contained in preamplifier read/write (RW) ICs. A separate preamplifier (preamp) is used for each slider which contains a pair of read and write heads. The functioning of the preamps is controlled by setting parameter values in registers in the preamp by sending serial data to the preamp. Parameters can include write current value (Iw), overshoot amplitude value, overshoot duration value and thermal fly-height control (TFC).

Thermal fly-height control is a problem which has generated a variety of designs. For example, U.S. Pat. No. 7,457,072 to Dieron, et al. (Nov. 25, 2008) describes fly-height compensation for disk surface variations as a function of both the track, and the sector or sectors within the track, where data is to be read or written. The fly-height actuator can be a thermal actuator that includes heater located on the slider near the read/write head. The fly-height controller (FHC) for the thermal actuator stores band control signal values representative of heater power to be applied to the thermal actuator when reading or writing to a data track in the associated band of tracks. The FHC also either calculates from a programmed equation or recalls sector control signal (SCS) values representative of an heater power increment to be applied to the thermal actuator depending on the sector or sectors where data is to be written. The FHC sums the appropriate SCS value with the appropriate BCS value to achieve the desired heater power, resulting in the optimal fly-height not only for the selected band but also for the selected sector or sectors.

U.S. Pat. No. 7,023,647 to Bloodworth, et al. (Apr. 4, 2006) the fly height controller includes circuitry for adjusting the current through heat element resistor during transitions between read and write disk operations. These adjustments are applied in the form of relatively brief overdrive (high current to heat element resistor) and underdrive (low current to heat element resistor) pulses, each of which assist in the settling of the steady-state temperature of heads. The duration of the overdrive and underdrive pulses may be programmed by way of a timer, or alternatively may be manually controlled via a serial interface to fly height controller.

One approach to rotational TFC uses with an analog input to the preamp using an external digital-analog-converter (DAC). One disadvantage of this system is that only one parameter can be adjusted. In addition the external DAC requires an analog line to the preamp and noise on the analog line causes error in fly-height.

One aspect of the problem being addressed by the invention is the relatively slow nature of the process of setting parameters using serial communication methods. For example, in the prior art to update the DAC code number the entire DAC code number including a plurality of bits has to be sent to the preamp chip. Sending the required bits serially might require >300 ns, for example, per register write, and this process is too slow for the short available windows when there is no reading or writing underway in the gap area and, therefore, no risk of interference signals. The short read-to-write and write-to-read time gaps occur in each sector between the servo area and data area. Sending serial data to the preamp when a read signal or write signal is being processed can result in interference between the wires going to/from preamp.

For improved performance, there is a need to be able to update some or all of the preamplifier parameters within a single rotation of the disk. However, the conventional serial communication protocol to the preamplifiers is too slow to be completed in read/write gap windows and can interfere with read and write data causing jitter issues if serial data is transmitted outside of the gaps.

SUMMARY OF THE INVENTION

Embodiments of the invention implement preamp rotational parameter control (RPC) using standard digital serial interface lines to the preamp and DACs on the preamp IC. The standard serial interface lines are used to generate a special signal pattern that does not follow the serial communication protocol. The special signal pattern is used to implement RPC when doing so will not adversely affect other signals. The preferred embodiment described herein performs digital signal transfers for RPC in the read/write recovery gap between the data and the servo field in a standard track format. Embodiments of the invention use a set of register bits in the preamp to provide general control over the RPC functions. For example, one RPC register bit can be used for enable or disable updating for each parameter, e.g. write current (Iw), overshoot amplitude (OSA), overshoot duration (OSD) and thermal fly-height control (TFC). Additional bits can be used for implementation specific parameters such as offsets. The initial parameter values can be set using existing preamp serial interface (SIF) commands.

In an embodiment of the invention a value of a selected preamp parameter can be incremented or decremented by one LSB during the read/write gap time in each servo sector as the disk rotates. In one embodiment there are four parameters in the set, therefore, each parameter can be updated one DAC LSB every 4 servo sector IDs, which allows for multiple updates of each parameter per revolution. In an alternative embodiment faster updates are achieved by having only two parameters in the set.

The invention allows fly-height and write driver parameters to be varied inside of a single disk revolution. The invention eliminates the need for and external DAC driving an analog signal to Preamp for TFC and also eliminates the need to change TFC with long SIF programming during read or write operations.

Embodiments of the invention use existing preamp serial interface (SIF) control lines to implement RPC. For example, the SEN line can be used to start the update sequence. The SCLK line can then be pulsed to trigger the update of the selected parameters. One of the existing wires in the serial interface such as SDATA can be used to determine whether an increment or decrement is to be performed. For example, if SDATA line is HIGH then parameter is incremented, or if SDATA line is LOW. The same clock pulse width can be used as in normal SIF communication clocking.

DETAILED DESCRIPTION OF THE INVENTION

Figure 1A:
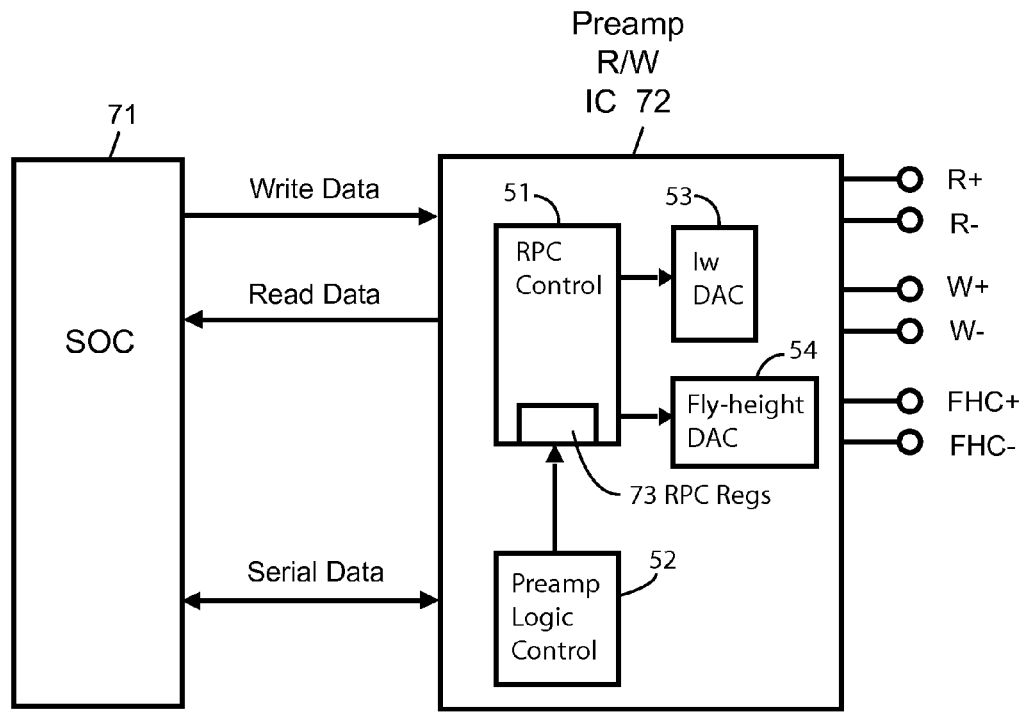
FIG. 1A is an illustration of selected components of a disk drive with rotational parameter control according to an embodiment of the invention.

FIG. 1A is an illustration of selected components of a disk drive with rotational parameter control implemented in a read/write (R/W) IC preamp 72 according to an embodiment of the invention. A disk drive will typically only have one system on a chip (SOC) 71 which implements most of the electronics and firmware functions. Although only one preamp 72 is shown a disk drive will typically have a one preamp for each set of read/write heads. The preamp 72 generates signals for the write head and fly-height control element in the slider (not shown), The preamp 72 receives serial data from the SOC which is used to set parameters used by the preamp. The functional components for this embodiment include the RPC Control block 51 which generates control signals according to the invention for the write current Iw DAC 53 and Fly-height DAC 54. The Preamp Logic Control block 52 supplies the signals from the serial data interface for the RPC Control block 51. This embodiment of the invention uses rotational parameter control (RPC) registers 73, which is set by serial data from the SOC. The standard preamp parameters starting points are initially programmed using existing preamp SIF commands.

In embodiments of the invention register assignment for each selected parameter should include:
Enable/Disable RPC parameter;
Set initial parameter point set (RPC Init). TFC should be set to highest clearance point (minimum TFC);
Set parameter range limit (RPC Range limit);
Set parameter offset to force DAC value to starting LBA (RPC offset);
Set RPC Fault enable (one fault per parameter);
Set TFC LSB jump size, e.g. 4 or more settings.
To avoid over-run or under-run of parameters, preamp parameters are set to an appropriate starting point and parameter limits should be implemented so that further increments or decrements do not occur beyond a safe limit. In order to save register bits the RPC range limit value can be ¼, ½, ¾, or max of the RPC DAC value and only 2 bits can be to select from these four options for each RPC.

An example of RPC register 73 bit assignments (total added bits=31) for an embodiment of the invention are:
RPC Enable/Disable for each parameter (TFC, IW, OSA, OSD) (4 bits, '1'=enable, '0'=disable)
RPC Offset (TFC-put over Servo TFC offset bits, 3 bits-Iw, 3 bits-OSA, 3 bits-OSD, '011'=max positive offset, '111'=max negative offset)
Read TFC RPC Offset (8 bits), Write TFC RPC Offset (8 bits) and put into one register ('01111111'=max positive offset, '11111111'=max negative offset)
RPC Range limit (set as 0.25x, 0.5x, 0.75x or 1.0x of Full scale DAC range): 2 bits TFC, 2 bits Iw, 2 bits OSA, 2 bits OSD ('00'=0.25x, '01'=0.5x, '10'=0.75x, '11'=1.0x)
RPC Fault enable (4 bits, '1'=enable, '0'=disable)
RPC Fault report (4 bits, '1'=fault reported, '0'=no fault)
RPC TFC LSB step size (2 bits, '00'=2 lsb step, '01'=4 lsb step, '10'=8 lsb step, '11'=12 lsb step).

The digital signal transfers for rotational parameter control (RPC) must take place when doing so will not adversely affect other signals. The preferred embodiment described herein performs digital signal transfers for RPC while a recovery field in a track passes under a head. However, in some disk drive applications it might be possible to have the digital signal transfers occur over read or servo data as well, but this is not the preferred method.

Figure 1B:
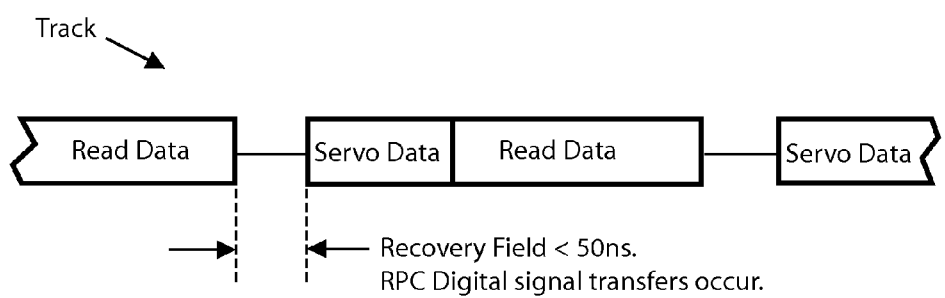
FIG. 1B is an illustration of a selected portion of a track showing the recovery field in which digital signal transfers occur for rotational parameter control according to an embodiment of the invention.

FIG. 1B is an illustration of a selected portion of a track showing the recovery field in which digital signal transfers occur for rotational parameter control according to an embodiment of the invention. FIG. 1B shows that a small recovery field (gap) exists between the read data and servo data in each of the plurality of servo sectors around a track in the conventional servo format. This field is also known as the read-to-servo recovery or write-to-servo recovery field. This field is typically <50 ns and during this field high-speed switching digital serial data can be transferred to the preamp without affecting the read signal performance of the read data or servo data. The invention can be used with the conventional servo format by timing the RPC signals to occur when the slider is passing over the recovery field as shown.

Figure 2:
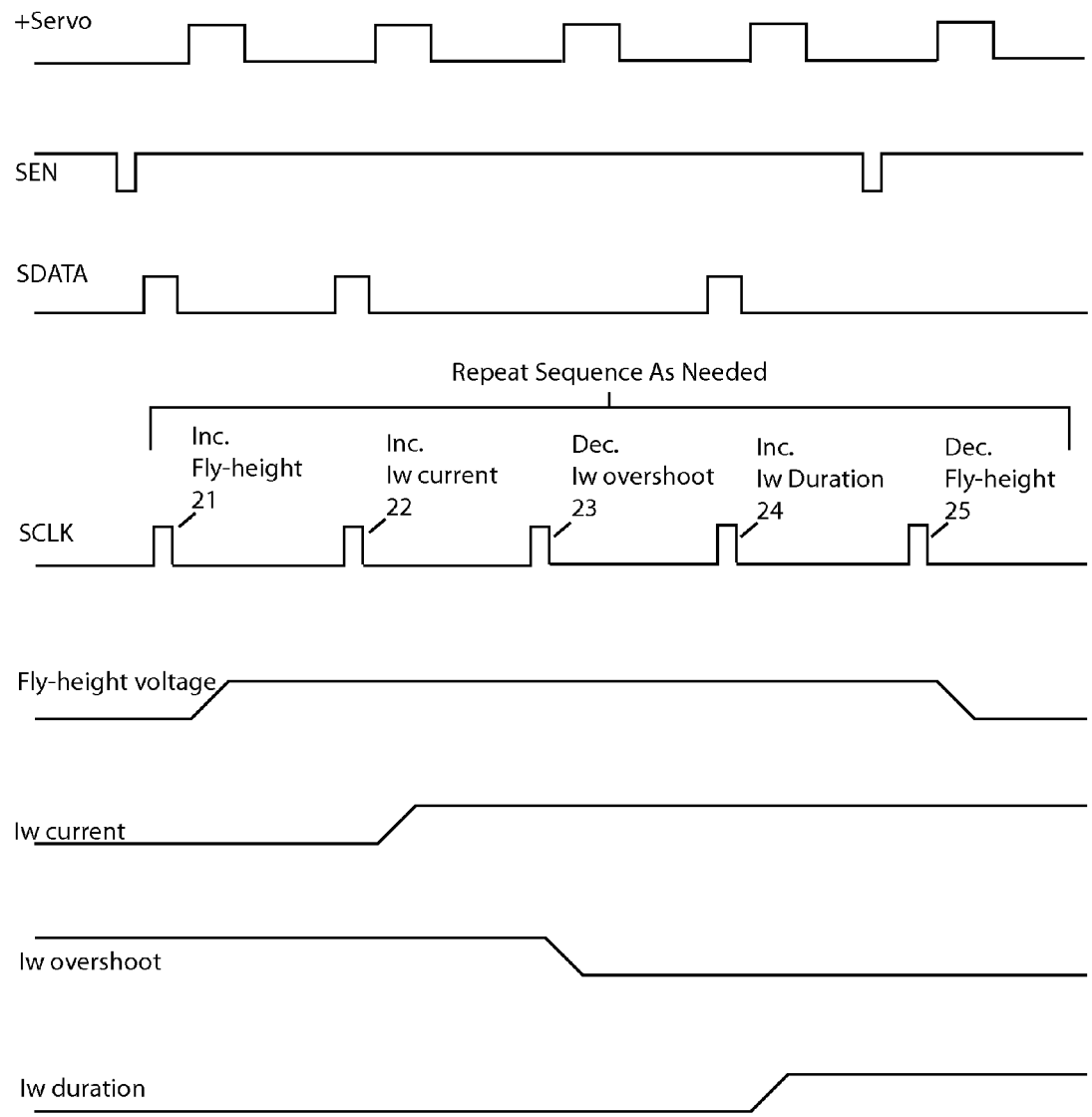
FIG. 2 is an illustration of the timing of selected signals for a first rotational parameter control scenario according to an embodiment of the invention.

FIG. 2 illustrates the timing of selected signals for preamp rotational parameter control (RPC) in an embodiment of the invention. The SEN, SDATA and SCLK lines are part of the standard serial data interface and are inputs to the preamp from the SOC. The +SERVO signal is internal to the SOC and is shown to indicates where the Servo Data is located in the timing sequence and determines the location of the recovery field just before the next Servo Data field. The SEN, SDATA and SCLK lines are controlled by the SOC to read and write registers to the Preamp. However, for the purpose of the invention, the SEN, SDATA and SCLK signals are generated from the SOC Servo system in a different pattern (than in the standard serial communication) to control user specified parameters using a short enough time span to fit within the recovery field. The SEN, SDATA and SCLK lines can be controlled by the SOC to generate logic sequences that do not follow the serial communication protocol. For example in the standard serial communication protocol the SEN line is held low during the entire bit transmission sequence, but when used in embodiments of the invention, SEN is briefly pulsed to indicate the start of the RPC cycle. The SCLK signal is used in RPC embodiments as an independent logic signal, rather than a clock. The SDATA line is used as an increment or decrement flag, rather than as data bit. The roles of the SEN, SDATA and SCLK lines in the described embodiments are arbitrary and other embodiments can use other choices. For example, the roles of SCLK and SEN could be swapped and so forth. The SOC and the preamp must each be designed to according to whatever arbitrary choices are made in order communicate and function properly.

The fly-height, Iw current, Iw overshoot, and Iw duration signals are generated internally by the preamp. RPC are timed to fit within the write-to-servo or read-to-servo recovery period so that no changes to the servo format are required.

This embodiment of RPC uses one clock pulse to increment or decrement one LSB for 1 of 4 selected parameters: fly-height, Iw current, Iw overshoot, Iw duration. The number and sequence of the parameters is fixed in a particular embodiment. The starting point for the 4 SCLK pulse sequence is the SEN pulse, which needs to have a short pulse to reset the sequence counter. The SEN pulse is timed to coincide with the end of the data field so that the RPC update can occur in the recovery field before the next servo field. Therefore, the SOC derives the timing of the SEN from the timing of the servo field passing under the read head. Up to four pulses after the SEN can be used, but pulses at the end the sequence can be omitted. Rotational parameters are ignored when SEN is low, i.e. the preamp is in the normal SIF programming state.

In this illustration in FIG. 2 five SCLK pulses and 2 SEN pulses are shown, and the updating function is assumed to be enabled by previous setting of the RPC register. The SDATA line, which is part of the serial data interface from the SOC, determines polarity of parameter change. The first SCLK pulse 21 follows the first SEN pulse and in this embodiment is assigned to the fly-height control. Because the SDATA has been set by the SOC high, the preamp increments the fly-height voltage parameter for SCLK pulse 21. For SCLK pulse 25, however, the SDATA is low as set by the SOC, the preamp decrements the fly-height voltage parameter. The signal line for the fly-height voltage is shown with an increase after the SCLK pulse 21 and a decrease after the SCLK pulse 25.

The second SCLK pulse 22 after the SEN pulse is associated with the Iw current parameter and because SDATA is high, the Iw current parameter is incremented. The third SCLK pulse 23 is associated with the Iw overshoot parameter and because SDATA is low, it is decremented. The fourth SCLK pulse 24 is associated with the Iw duration parameter and because SDATA is high, it is incremented. Each parameter in the set could be updated one DAC LSB every 4 servo IDs. The same clock pulse width as normal SIF communication clock rate can be used.

Figure 3:
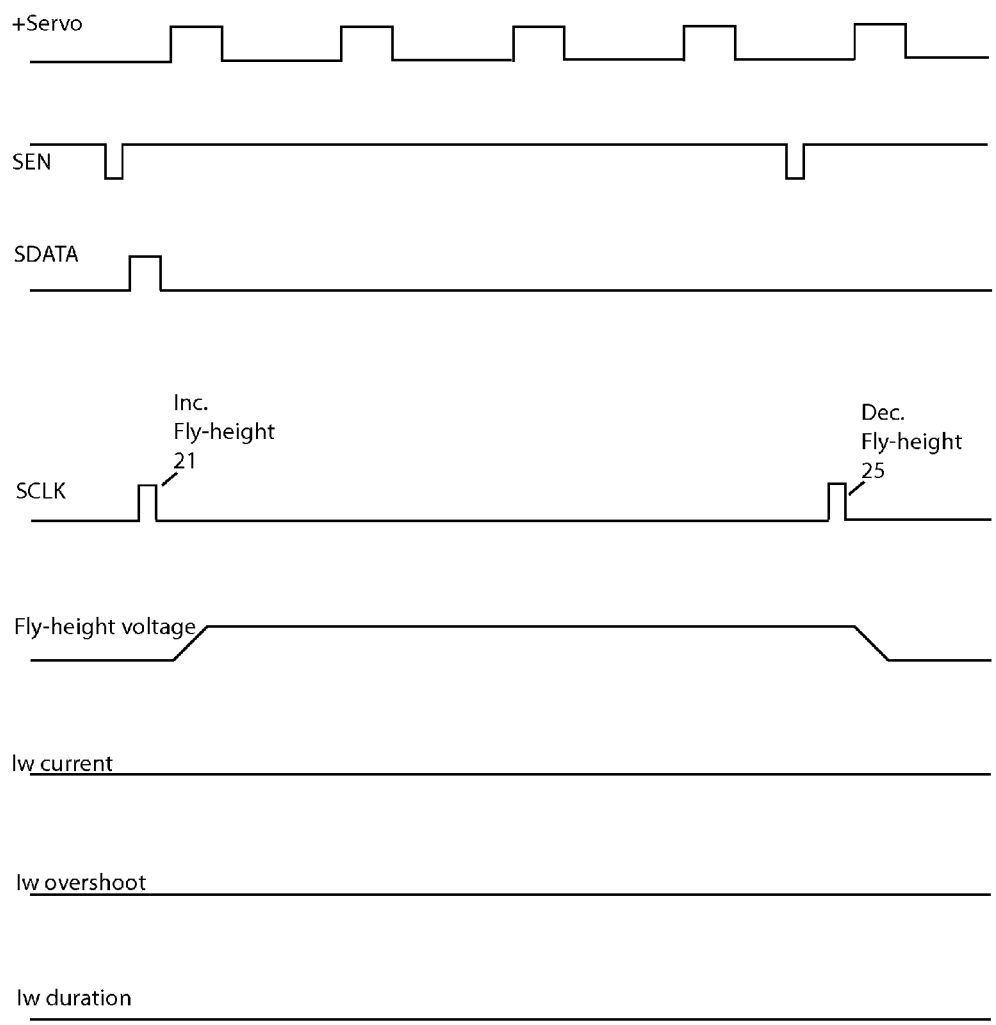
FIG. 3 is an illustration of the timing of selected signals for a second rotational parameter control scenario according to an embodiment of the invention.

Another control scenario is illustrated in the timing diagram of FIG. 3, which shows that pulsing SCLK once between SEN pulses causes only TFC to be updated because it is assigned the first slot in the parameter set. The second, third and fourth SCLK pulses in the previous example are omitted and therefore, Iw current, Iw overshoot and Iw duration will not change. From one to four SCLK pulses can occur between SEN pulses in this embodiment.

Figure 4:
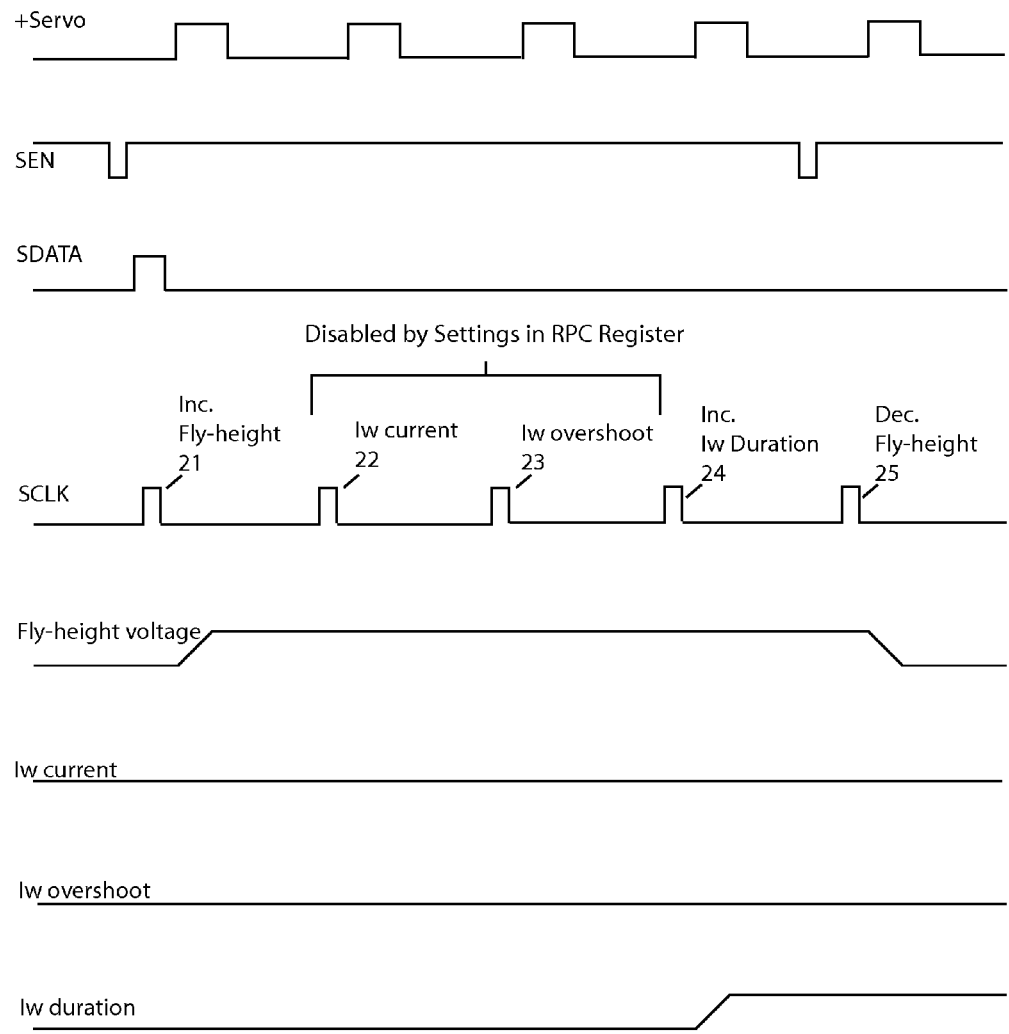
FIG. 4 is an illustration of the timing of selected signals for a third rotational parameter control scenario according to an embodiment of the invention.

Another method of RPC control in embodiments of the invention is for the updating function for one or more parameters to be disabled by setting the corresponding bits in the RPC registers. Thus, for example, as illustrated in FIG. 4 the SOC can disable Iw current and Iw overshoot updating while leaving fly-height and Iw duration enabled.

Figure 5:
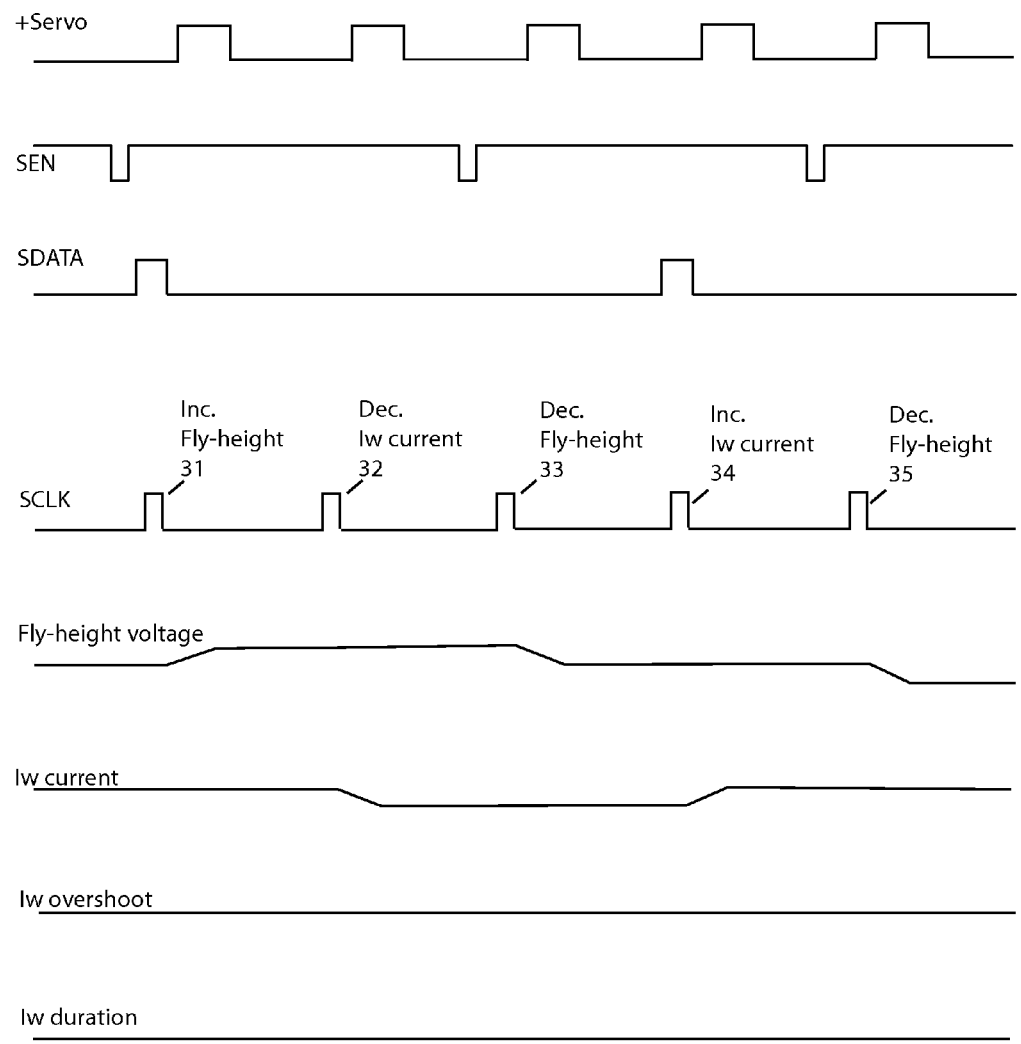
FIG. 5 is an illustration of the timing of selected signals for an embodiment of the invention that updates only the fly-height and Iw current parameters in each cycle.

The selection of how many and which parameters to update in a cycle can be varied in alternative embodiments. For example, if the fly-height in a disk drive needs quicker updating than every four servo fields, the number of parameters can be reduced to two and these two parameters can be updated every two servo fields. FIG. 5 is an illustration of the timing of selected signals for an embodiment of the invention that updates only the fly-height and Iw current parameters in each cycle. In this case there are a maximum of two SCLK pulses between SEN pulses. In the first cycle shown, the first SCLK pulse 31 increments the fly-height and the second SCLK pulse 32 decrements Iw. In the second cycle shown, SCLK pulse 33 decrements the fly-height and SCLK pulse 34 increments Iw. In the next cycle shown, the SCLK pulse 35 decrements the fly-height. In this embodiment Iw overshoot and Iw duration will not be dynamically updated.

If a rotational parameter is disabled by the setting in the RPC register, the parameter will not change even if the SCLK and SDATA change when SEN is high. When SEN is low normal register programming is performed. The preamp should ignore any SIF Clock Count Faults occur during the RPC window.

Figure 6:
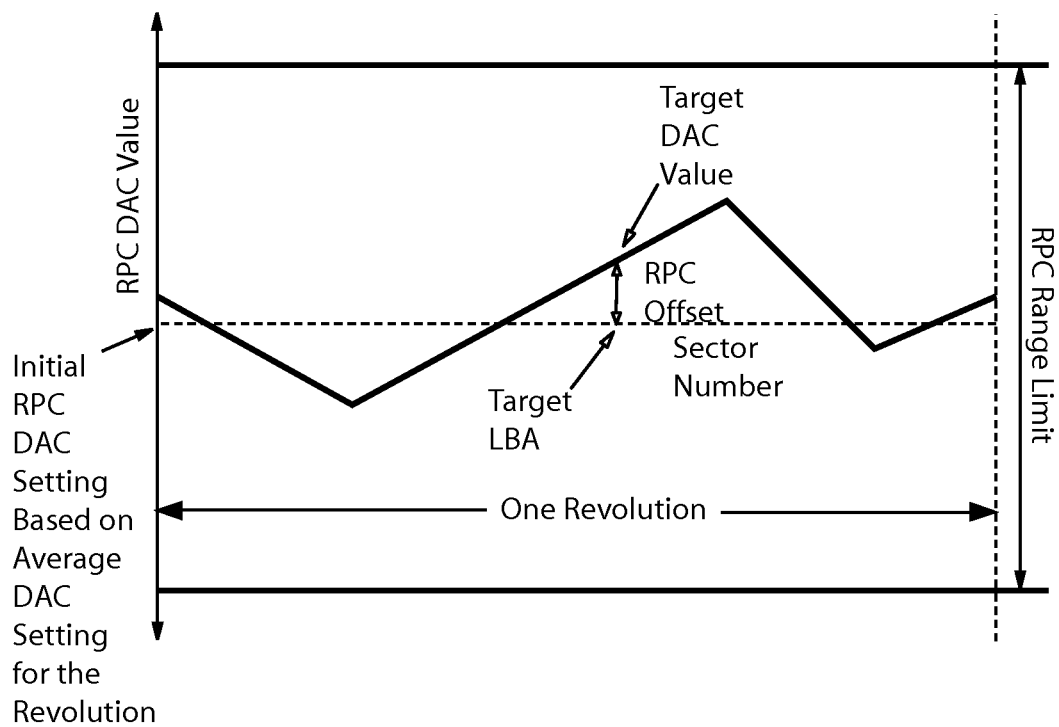
FIG. 6 is an illustration for the method of setting an RPC offset for an embodiment of the invention.

If an initial RPC DAC setting is not centered, the RPC range limits can be truncated. In order to improve the RPC DAC value after a seek, an 'RPC Offset' can be used. FIG. 6 is an illustration of the method of setting an RPC offset for an embodiment of the invention. Since the first target LBA can start anywhere during the disk revolution, the RPC offset is needed to quickly adjust to the target DAC value for that LBA with a positive or negative offset value. This allows the RPC DAC value to be set with a normal SIF command and without changing RPC range limit. A rewrite of the initial RPC DAC setting sets the RPC offset back to zero.

Figure 7:
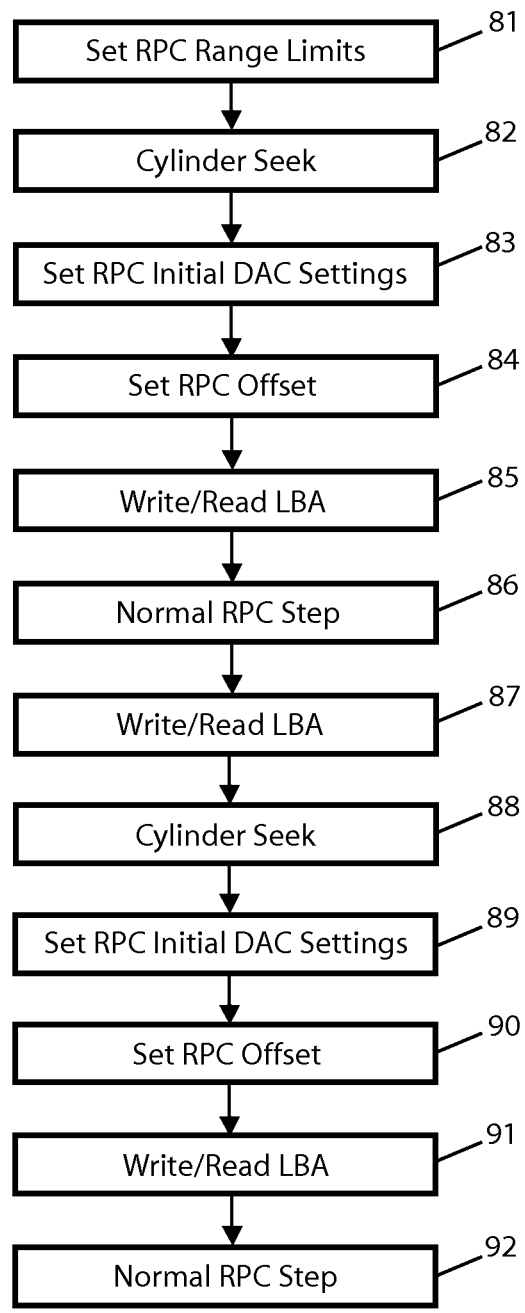
FIG. 7 is a flowchart illustration of the method of setting an RPC offset for an embodiment of the invention.
Figure 8:
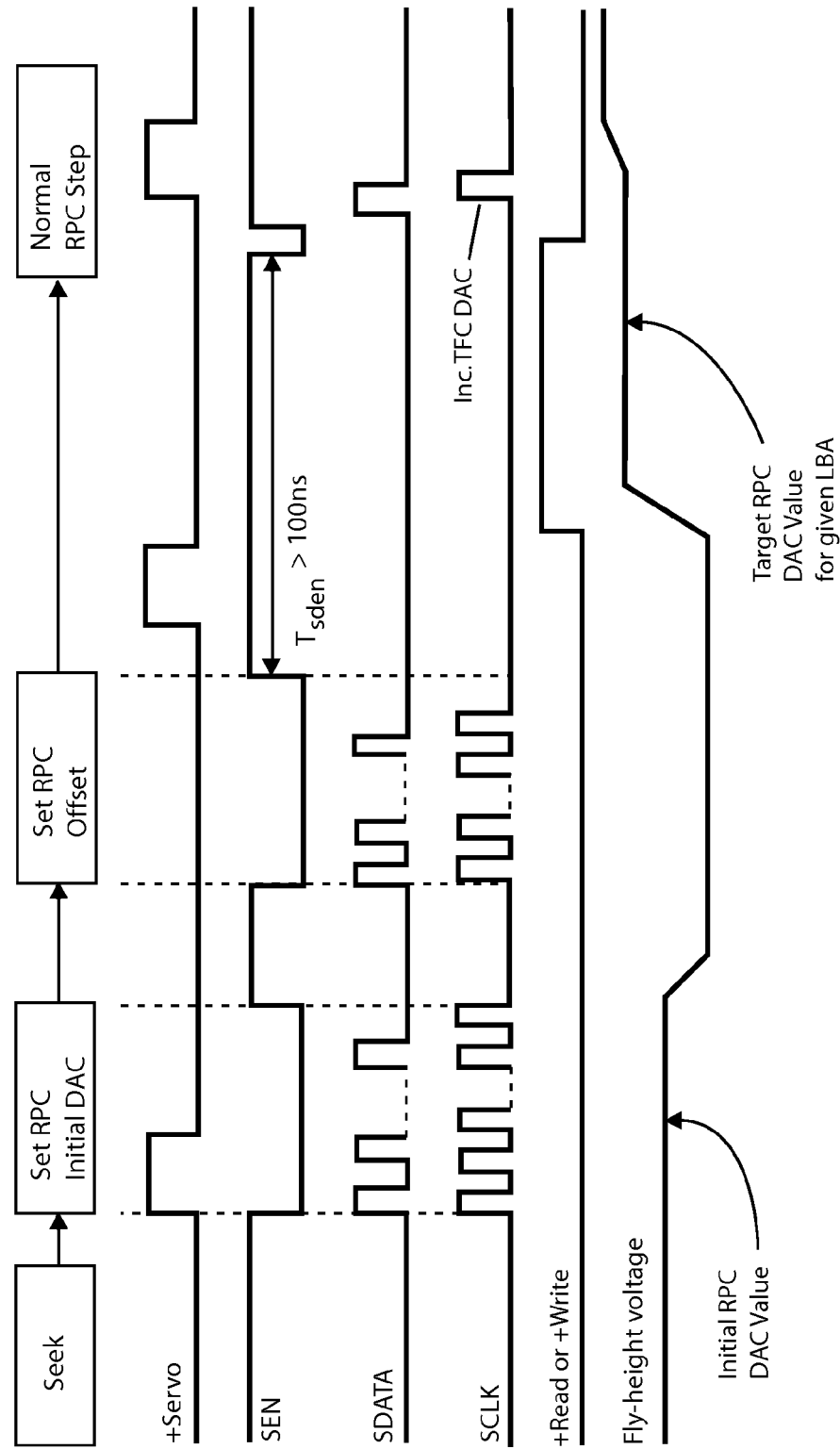
FIG. 8 illustrates the signal timing for an example of using 'Set RPC Offset' for the TFC DAC to catch up to the correct LBA (TFC RPC only example).

FIG. 7 is a flowchart illustration of the method of setting an RPC offset for an embodiment of the invention. The RPC range limits are set 81, then a cylinder seek is performed 82. The initial RPC DAC parameters are set 83 along with the RPC offset 84. A write or read on the LBA is performed 85 followed by a normal RPC step 86. A write or read on the LBA is performed again 87 followed by a cylinder seek 88. The initial RPC DAC parameters are set 89 along with the RPC offset 90. A write or read on the LBA is performed 91 followed by a normal RPC step 92. FIG. 8 illustrates the signal timing for an example of using 'Set RPC Offset' for the TFC DAC to catch up to the correct LBA (TFC RPC only example).

The RPC offset needs to have positive and negative values, so a signed magnitude binary system will be used to set the RPC offset. When reading the PRC DAC parameter value back, the result should reflect the actual DAC value, so RPC_Dac_value=RPC_initial_value+RPC_offset+RPC_inc_or_dec.

Figure 9:
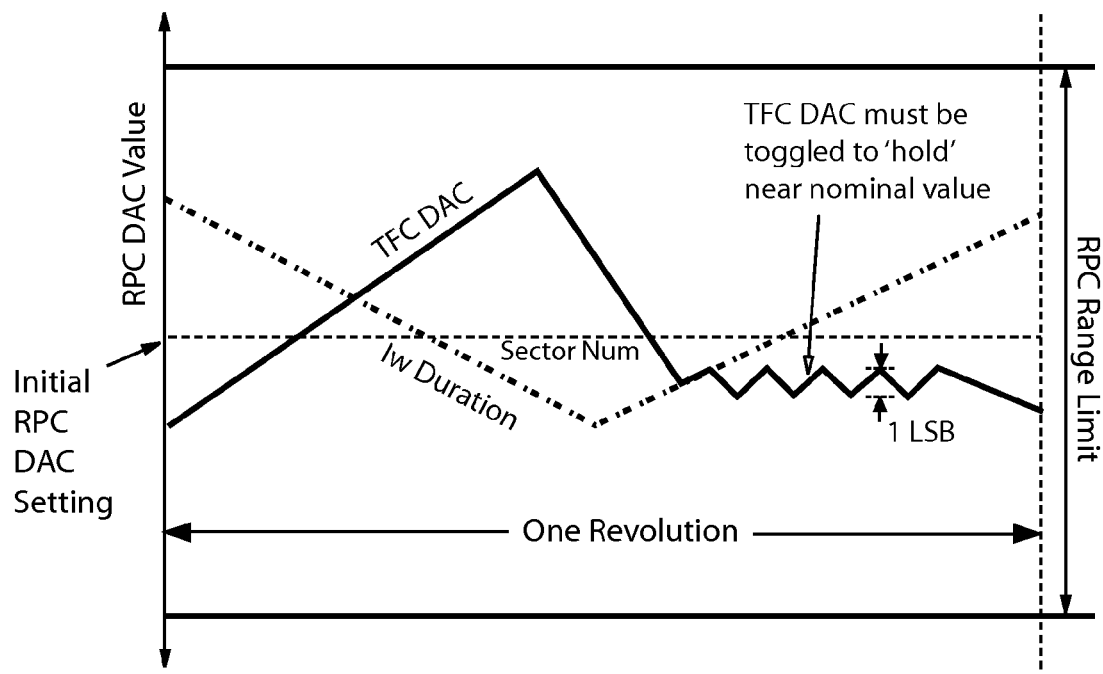
FIG. 9 illustrates that RPC toggling is needed if the TFC algorithm needs to hold the TFC DAC value near a nominal value for multiple sectors.

As illustrated in FIG. 9, RPC toggling is needed if the TFC algorithm needs to hold the TFC DAC value near a nominal value for multiple sectors. The figure shows Iw duration DAC changes while TFC DAC needs to be held. Because there is no way to hold the TFC value, the only way to keep the TFC value near the correct value is to toggle the TFC DAC up one LSB and down one LSB.

In an embodiment of the invention any normal preamp SIF command will reset the parameter counter in the preamp. This means the first RPC parameter to change after a SIF command will be the parameter that is the first in the cycle, e.g. TFC, so a 'Normal RPC Step' sequence needs to start again with TFC after an SIF command.

When seeking TFC goes through phases before the LBA is read or written. There should be two separate TFC RPC Offset values for read and write. One value if for the read TFC, known as RTFC, and the other value is for write TFC, known as WTFC. The read TFC and write TFC are needed to set the correct fly-height when reading or writing data. For example, at the start (e.g. hundreds of tracks away) of the seek RTFC and WTFC could be set to 0 and if RPC is enabled then each offset is also set to 0. In the TFC boost phase the RTFC could be set to a preheat boost value and the WTFC to a selected initial value. In the late stage of the seek, if RPC is enabled then each offset is set to the LBA target.

Figure 10:
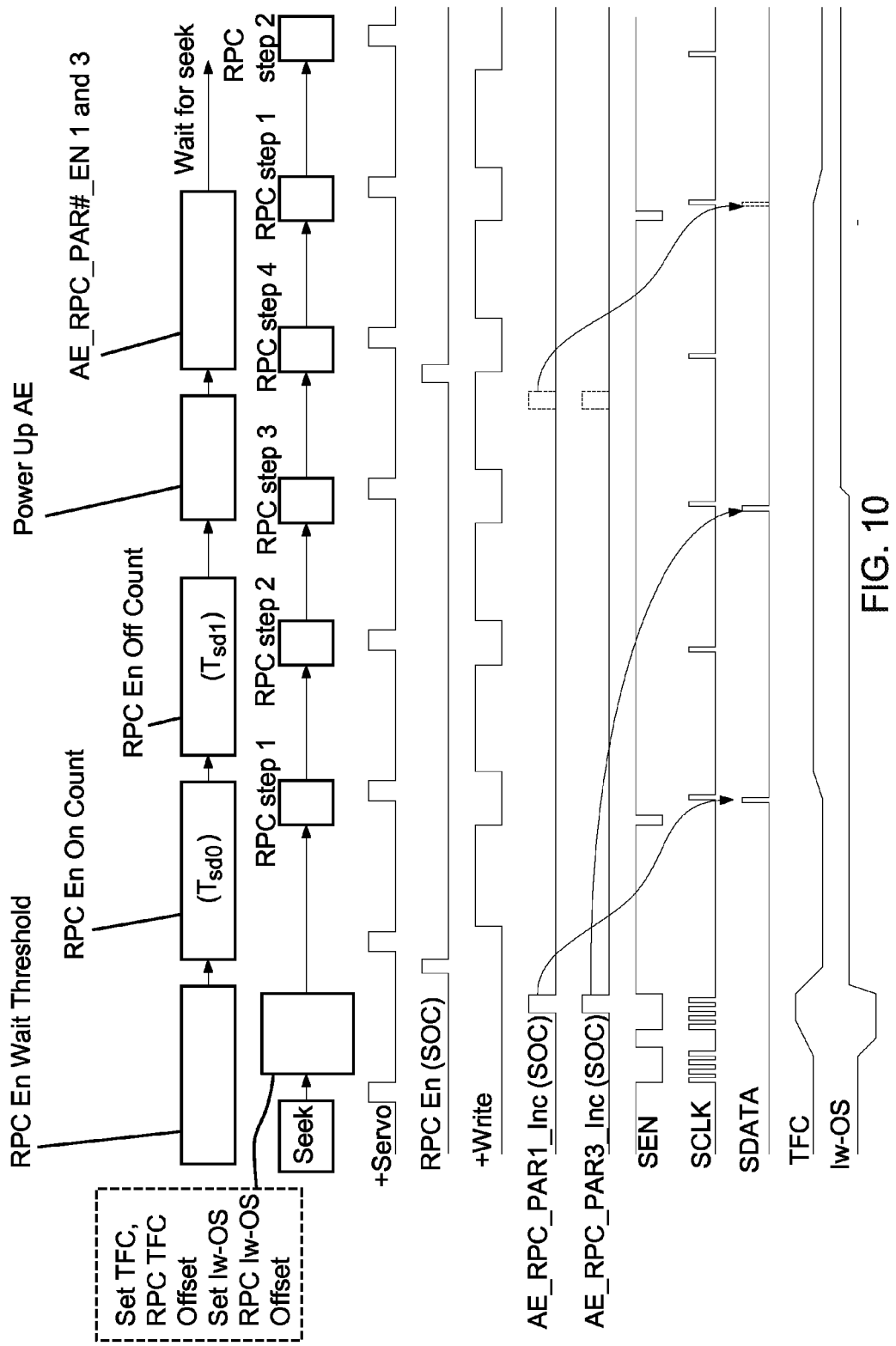
FIG. 10 illustrates the signal timing for an example of using 2 of 4 preamp parameters (TFC and Iw-OS).
Figure 11:
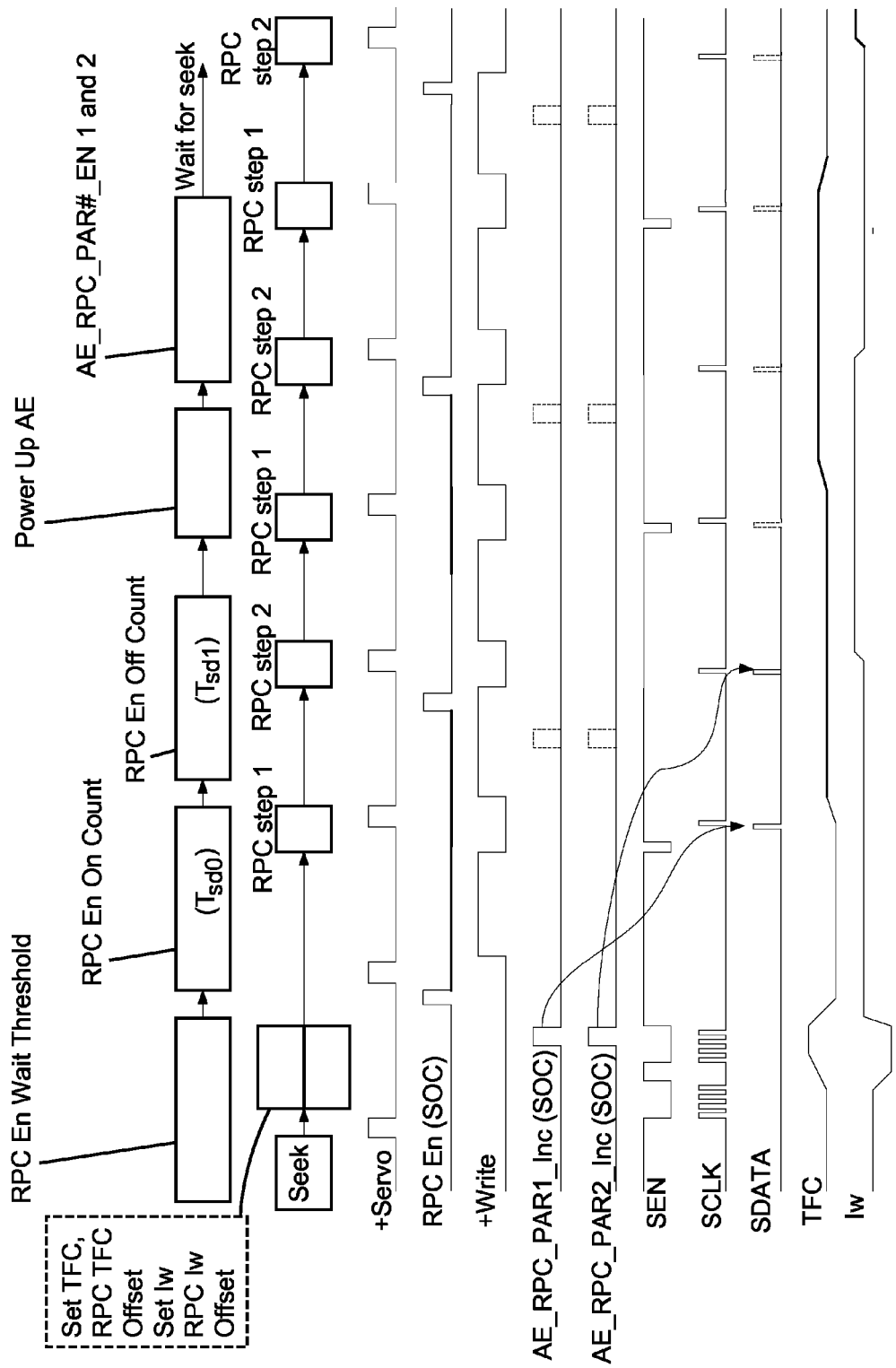
FIG. 11 illustrates the signal timing for an example of using 2 of 4 Preamp parameters (TFC and Iw) with updates every other SID.

FIG. 10 illustrates the signal timing for an example of using 2 of 4 preamp parameters 1 (TFC) and 3 (Iw-OS). FIG. 11 illustrates the signal timing for an example of using 2 of 4 Preamp parameters 1 (TFC) and 2 (Iw) with updates every other SID.

TABLE 1

RPC register mode values.

| RPC Case | Original RPC DAC Value | Original RPC Offset Value | Adjusted RPC Offset Value | Adjusted RPC DAC Result |
|---|---|---|---|---|
| RPC Off to On | X | 0 | 0 | X |
| RPC Off to On | X | Y | 0 | X |
| RPC ON, RPC Offset Change | X | 0 | Y | X + Y |
| RPC On, RPC Inc/Dec Change (Z) | X | Y | Y | X + Y + Z |
| RPC On to RPC Off | X | Y | Don't Care | X |

The invention claimed is:

1. A method of operating a disk drive that has a digital serial communication interface that includes a plurality of lines connecting a system electronics module to a preamp module comprising:
   setting initial values for a set of rotational parameter values used by the preamp by sending data to the preamp using the digital serial communication interface; and
   adjusting selected rotational parameter values in the set while a disk is rotating by signaling the preamp using two or more of the lines in the digital serial communication interface, the preamp responding to the signaling by incrementing or decrementing a predetermined rotational parameter value used by the preamp.

2. The method of claim 1 wherein signaling the preamp is timed to occur while a recovery field passes under a head.

3. The method of claim 1 wherein signaling the preamp further comprises:
   sending a start signal for a rotational parameter control sequence to the preamp module by pulsing a first selected line of the digital serial communication interface;
   setting a second selected line of the digital serial communication interface to determine whether incrementing or decrementing is to be performed by the preamp; and
   pulsing a third selected line of the digital serial communication interface to trigger adjustment of the selected rotational parameter value by the preamp.

4. The method of claim 1 wherein adjusting selected rotational parameter values in the set further comprises:
   sending a start signal for a rotational parameter control sequence to the preamp module on a first selected line of the digital serial communication interface;
   setting a second selected line of the digital serial communication interface to determine whether incrementing or decrementing is to be performed for a first rotational parameter value in the set;
   pulsing a third selected line of the digital serial communication interface to trigger adjustment of the first rotational parameter value while a first recovery field in a first servo sector passes under a head;
   setting the second selected line of the digital serial communication interface to determine whether incrementing or decrementing is to be performed for a second rotational parameter value in the set; and
   pulsing the third selected line of the digital serial communication interface to trigger adjustment of the second rotational parameter value while a second recovery field passes under a head, the second recovery field being in a second servo sector following the first servo sector.

5. The method of claim 4 wherein the first rotational parameter value is thermal fly-height control (TFC) and second rotational parameter value is write current.

6. The method of claim 1 further comprising: sending data to the preamp using the digital serial communication interface that separately enables or disables updating of each of the rotational parameter values the set.

7. The method of claim 1 wherein thermal fly-height control (TFC) is one of the rotational parameter values in the set and the method further comprises holding the TFC value near a nominal value for multiple sectors by repeatedly toggling the TFC value up one increment and then down one increment.

8. The method of claim 1 wherein the preamp stores rotational parameter control (RPC) information received on the digital serial communication interface in one or more registers and the RPC information includes for each parameter in the set of rotational parameters enable/disable bits and a parameter range limit.

9. The method of claim 1 wherein the preamp stores rotational parameter control (RPC) information received on the digital serial communication interface in one or more registers and the RPC information includes a parameter offset for at least one parameter in the set of rotational parameters.

10. The method of claim 1 wherein the preamp stores rotational parameter control (RPC) information received on the digital serial communication interface in one or more registers and the RPC information includes a least significant bit (LSB) increment size for at least one parameter in the set of rotational parameters.

11. A disk drive having system electronics module connected to a preamp module by a digital serial communication interface that includes a plurality of lines, the disk drive comprising:
   the system electronics module setting initial values for a set of rotational parameter values used by the preamp by sending data to the preamp using the digital serial communication interface, the system electronics module adjusting selected rotational parameter values in the set while a disk is rotating by signaling the preamp using two or more of the lines in the digital serial communication interface; and
   the preamp responding to the signaling using two or more of the lines in the digital serial communication interface by incrementing or decrementing a predetermined rotational parameter value used by the preamp.

12. The disk drive of claim 11 wherein signaling the preamp using two or more of the lines in the digital serial communication interface is timed to occur while a recovery field passes under a head.

13. The disk drive of claim 11 wherein the system electronics module pulses a first selected line of the digital serial communication interface as a start signal for a rotational parameter control sequence; the system electronics module updates a selected rotational parameter value by setting a second selected line of the digital serial communication interface to determine whether incrementing or decrementing is to be performed by the preamp; and the system electronics module pulses a third selected line of the digital serial communication interface while a recovery field passes under the head to trigger adjustment of the selected rotational parameter value by the preamp.

14. The disk drive of claim 11 wherein the rotational parameter control sequence includes one start signal followed by updating each of the rotational parameter values in the set by setting the second selected line of the digital serial communication interface to determine whether incrementing or decrementing is to be performed by the preamp; and the system electronics module pulses a third selected line of the digital serial communication interface while a recovery field passes under the head to trigger adjustment of the selected rotational parameter value by the preamp.

15. The disk drive of claim 11 wherein the set of rotational parameter values includes thermal fly-height control (TFC) and write current.

16. The disk drive claim 11 wherein the preamp further comprises means for receiving information from the digital serial communication interface that separately enables or disables updating of each of the rotational parameter values the set.

17. The disk drive of claim 11 wherein thermal fly-height control (TFC) is one of the rotational parameter values in the set and the system electronics module holds the TFC value near a nominal value for multiple sectors by repeatedly toggling the TFC value up one increment and then down one increment.

18. The disk drive of claim 11 wherein the preamp further comprises means for receiving rotational parameter control (RPC) information from the digital serial communication interface and the RPC information includes for each parameter in the set of rotational parameters enable/disable bits and a parameter range limit.

19. The disk drive claim 11 wherein the preamp stores rotational parameter control (RPC) information received on the digital serial communication interface in one or more registers and the RPC information includes a parameter offset for at least one parameter in the set of rotational parameters.

20. The disk drive of claim 11 wherein the preamp stores rotational parameter control (RPC) information received on the digital serial communication interface in one or more registers and the RPC information includes a least significant bit (LSB) increment size for at least one parameter in the set of rotational parameters.

\* \* \* \* \*